(12) United States Patent
Marchandise et al.

(10) Patent No.: US 11,066,190 B2
(45) Date of Patent: Jul. 20, 2021

(54) METHOD FOR DEPLOYING A SATELLITE CONSTELLATION

(71) Applicant: SAFRAN AIRCRAFT ENGINES, Paris (FR)

(72) Inventors: Frédéric Marchandise, Vernon (FR); Pamela Simontacchi, Maule (FR); Perrine Mathieu, Foucheres-aux-Bois (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 655 days.

(21) Appl. No.: 15/305,860

(22) PCT Filed: Apr. 21, 2015

(86) PCT No.: PCT/FR2015/051074
§ 371 (c)(1),
(2) Date: Oct. 21, 2016

(87) PCT Pub. No.: WO2015/162370
PCT Pub. Date: Oct. 29, 2015

(65) Prior Publication Data
US 2017/0043885 A1    Feb. 16, 2017

(30) Foreign Application Priority Data

Apr. 24, 2014   (FR) ..................... 1453690

(51) Int. Cl.
*B64G 1/00*   (2006.01)
*B64G 1/10*   (2006.01)
*B64G 1/24*   (2006.01)

(52) U.S. Cl.
CPC ........... *B64G 1/007* (2013.01); *B64G 1/1085* (2013.01); *B64G 1/242* (2013.01)

(58) Field of Classification Search
CPC ......... B64G 1/007; B64G 1/085; B64G 1/242
See application file for complete search history.

(56) References Cited

U.S. PATENT DOCUMENTS 5,199,672 A * 4/1993 King ................. B64G 1/007
                                                                244/164
5,393,017 A   2/1995 Smith et al.
(Continued)

FOREIGN PATENT DOCUMENTS

CN    1199697 A     11/1998
CN   101743702 A     6/2010
(Continued)

OTHER PUBLICATIONS

Cornara,Stefania, et al. "Satellite constellation launch, deployment, replacement and end-of-life strategies." (1999) (Year: 1999).*
(Continued)

*Primary Examiner* — Philip J Bonzell
(74) *Attorney, Agent, or Firm* — Bookoff McAndrews, PLLC

(57) ABSTRACT

A method of deploying a constellation of satellites includes using a single launch vehicle to deploy a plurality of satellites at an initial altitude on a same initial orbit, controlling said satellites such that an altitude of some of the satellites is modified while their inclination relative to an equatorial plane and a type of trajectory, of the some of the satellites, remains identical so that each satellite reaches a drift altitude selected from a drift set, with orbits of various satellites shifting relative to one another, and controlling the satellites to be moved sequentially in order to reach a same final altitude, said sequential movement being performed in such a manner that the satellites describe final orbits having trajectories with a same angle of inclination relative to the equatorial plane, a same apogee and perigee, and the same (Continued)

final altitude but presenting distinct longitudes for ascending nodes.

7 Claims, 3 Drawing Sheets

(56) References Cited

U.S. PATENT DOCUMENTS

| | | | | |
|---|---|---|---|---|
| 5,681,011 | A * | 10/1997 | Frazier | B64G 1/007 244/158.5 |
| 5,931,419 | A * | 8/1999 | Collyer | B64G 1/002 244/158.5 |
| 6,122,596 | A | 9/2000 | Castiel | |
| 6,198,990 | B1 * | 3/2001 | Croom | B64G 1/007 701/13 |
| 6,364,252 | B1 * | 4/2002 | Anderman | B64G 1/007 244/158.6 |
| 6,892,986 | B2 | 5/2005 | Bingaman et al. | |
| 7,832,687 | B1 | 11/2010 | Das et al. | |
| 2008/0027595 | A1 * | 1/2008 | Fowler | B64G 1/1085 701/13 |
| 2008/0237399 | A1 * | 10/2008 | Caplin | B64G 1/1085 244/158.4 |

FOREIGN PATENT DOCUMENTS

| | | | |
|---|---|---|---|
| EP | 0409721 | A1 | 1/1991 |
| JP | H07-187091 | | 7/1995 |
| JP | H11-079100 | | 3/1999 |
| JP | 2002-308198 | | 10/2002 |
| JP | 2005-145251 | | 6/2005 |
| JP | 2014-141108 | | 8/2014 |
| RU | 2 535 375 | | 12/2014 |
| RU | 2 535 760 | | 12/2014 |
| RU | 2535375 | C1 * | 12/2014 ........... B64G 1/1085 |

OTHER PUBLICATIONS

Chinese Office Action in corresponding Chinese Application No. 201580021321.2, dated Apr. 27, 2018 (7 pages—English translation included).

English translation of Russian Office Action in corresponding Russian Application No. 2016145879, dated Oct. 30, 2018 (3 pages).

Russian Search Report in corresponding Russian Application No. 2016145879, dated Oct. 29, 2018 (2 pages).

International Search Report in corresponding International Application No. PCT/FR2015/051074 dated Jul. 24, 2015 (6 pages—English Translation included).

English translation of Japanese Office Action in Japanese Patent Application No. 2016-564002, dated Apr. 2, 2019 (5 pages).

* cited by examiner

METHOD FOR DEPLOYING A SATELLITE CONSTELLATION

CROSS-REFERENCE TO RELATED APPLICATIONS

This application is the U.S. national phase entry under 35 U.S.C. § 371 of International Application No. PCT/FR2015/051074, filed on Apr. 21, 2015, which claims priority to French Patent Application No. 1453690, filed on Apr. 24, 2014.

GENERAL TECHNICAL FIELD

The present invention relates to launching satellites and putting them into orbit, and more particularly it relates to deploying a constellation of satellites.

STATE OF THE ART

Satellite constellations are used for numerous applications requiring broad and continuous coverage.

Such satellite constellations comprise a set of satellites describing distinct orbits around the Earth.

Nevertheless, deploying a plurality of satellites on distinct orbits, which are commonly angularly offset relative to one another, requires the use of a plurality of launchers, which is very constraining.

By way of example, a constellation of observation satellites in low orbit, with one observation per hour, requires 12 satellites to be deployed on different orbits. Unfortunately, deploying such a satellite constellation presently requires 12 distinct launches, which is very expensive, or requires a very large quantity of on-board propellant in order to be able to modify the orbits of the satellites after they have been deployed, which is likewise very problematic in terms of on-board mass.

Solutions have been proposed for deploying a plurality of satellites using a single launcher. Nevertheless, those solutions rely essentially on the ability of the launcher to reach the successive orbits in order to deploy the various satellites on them, or requires the satellites themselves to have the ability to modify their own orbits once they have been deployed, and that remains problematic in terms of on-board mass, given the quantity of propellant that is required.

The present invention thus seeks to propose a solution to that problem.

SUMMARY OF THE INVENTION

To this end, the present invention proposes a method of deploying a constellation of satellites, the method comprising the following steps:
  using a single launcher to deploy a plurality of satellites at the same initial altitude on the same initial orbit;
  controlling said satellites in such a manner that, depending on the initial orbit, each satellite reaches a drift altitude selected from a drift set, with the orbits of the various satellites shifting relative to one another at the respective drift altitudes under the effect of the gravitational potential of the Earth; and
  controlling the satellites in such a manner as to be moved sequentially in order to reach the same final altitude, said sequential movement being performed in such a manner that the satellites describe final orbits that are angularly offset from one another, i.e. having identical trajectories with the same angle of inclination relative to the equatorial plane, but presenting distinct longitudes for their ascending nodes.

In a particular implementation, the final orbits of the satellites are angularly offset relative to one another about the Earth's axis of rotation.

Said final orbits then typically present a constant angular offset between two successive final orbits.

By way of example, the drift set comprises a high drift altitude and a low drift altitude, having respectively an altitude that is higher and an altitude that is lower than the initial altitude.

By way of example, the starting altitude, the high drift altitude, the low drift altitude, and the final altitude then lie in the range 150 kilometers (km) to 75,000 km.

The final altitude of said satellites then typically lies between the initial altitude and the low drift altitude.

By way of example, the final altitude lies in the range 200 km to 800 km.

By way of example, the starting altitude is 800 km, the high drift altitude is 1500 km, the low altitude is 270 km, and the final altitude is 420 km.

In another variant, the starting altitude lies in the range 33,000 km to 38,000 km, and the final altitude lies in the range 20,000 km to 25,000 km.

The final orbits of said satellites typically have angles of inclination that are different from their initial orbits.

The present invention thus makes it possible to deploy some or all of the satellites of a constellation in a single launch, making advantageous use of the gravitational potential of the Earth for the purpose of modifying the orbits of some or all of the satellites as deployed in this way.

SUMMARY OF THE FIGURES

Other characteristics, objects, and advantages of the invention appear from the following description, which is purely illustrative and non-limiting, and which should be read with reference to the accompanying drawings, in which.

In the figures, elements that are common are identified by identical numerical references.

DETAILED DESCRIPTION

Figure 1:
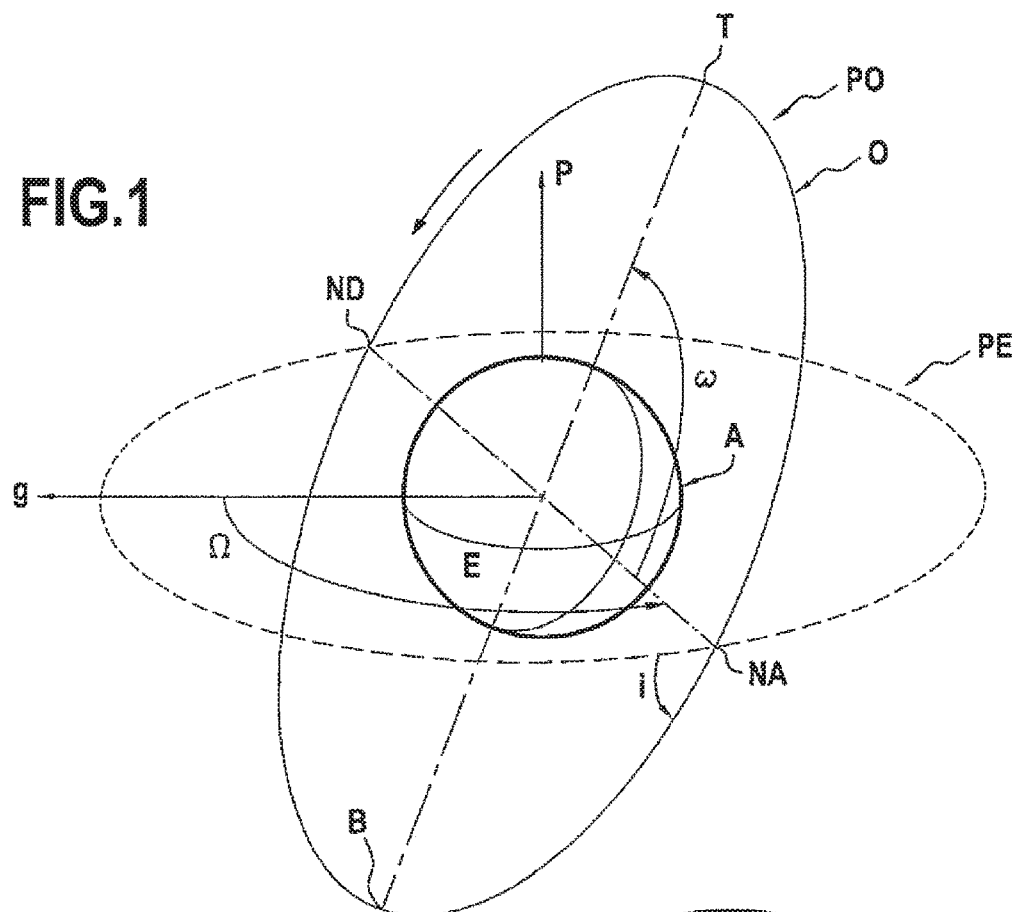
FIGS. 1 and 2 are diagrams showing the orbit parameters of a satellite.
Figure 2:
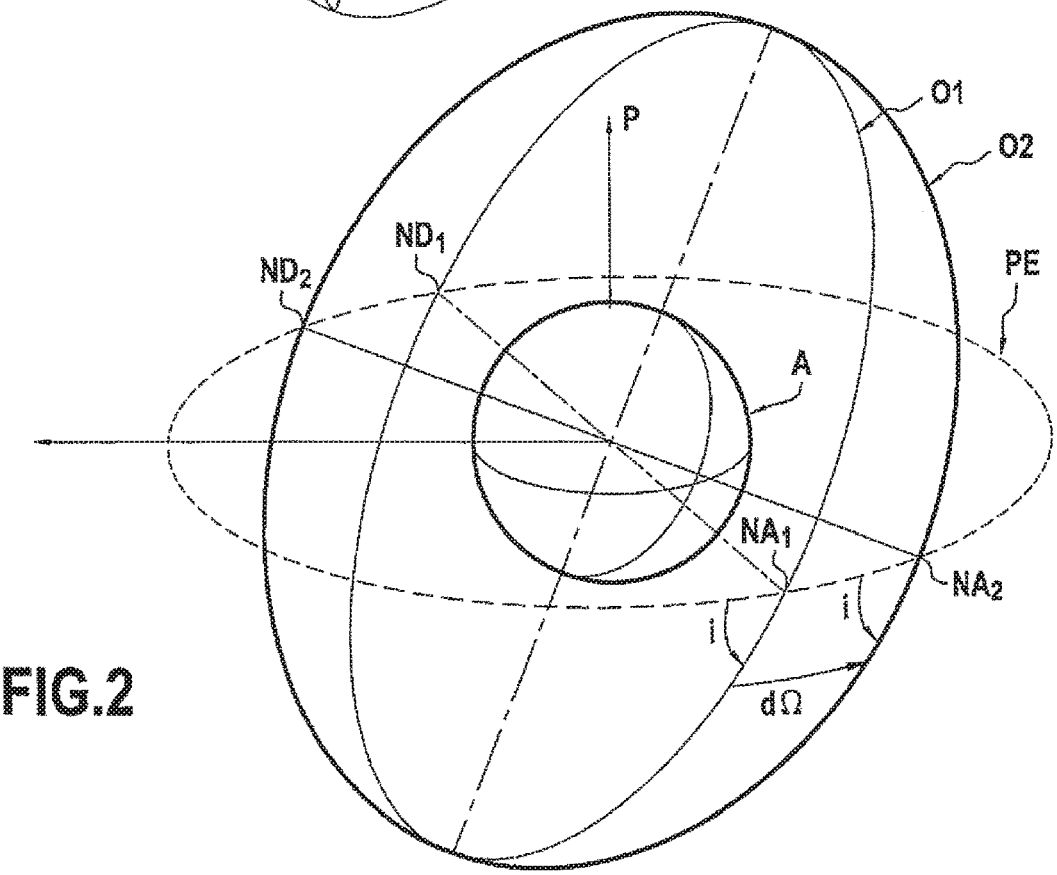

FIGS. 1 and 2 are diagrams showing the parameters of the orbit of a satellite.

In these figures, the Earth A is represented by a sphere, by the equator E, and by the axis P passing through the poles of the Earth.

These figures also define:
  an equatorial plane PE containing the equator E;
  the vernal point g defined as being the intersection between the ecliptic and the celestial equator; a vernal point direction is also defined as connecting the vernal point and the center of the Earth.

The orbit O of a satellite around the Earth is shown diagrammatically in FIGS. 1 and 2.

In these figures, there can be seen:

the angle of inclination i of the orbit plane PO, i.e. the plane that contains the orbit, relative to the equatorial plane PE. An angle of inclination of zero means that the orbit plane PO coincides with the equatorial plane PE;

the travel direction of the satellite, identified in arbitrary manner by an arrow;

the ascending node NA corresponding to the point of intersection between the orbit and the equatorial plane PE when the satellite goes from the southern hemisphere to the northern hemisphere;

the descending node ND corresponding to the point of intersection between the orbit and the equatorial plane PE when the satellite goes from the southern hemisphere to the northern hemisphere; and the apogee B and the perigee T, corresponding for an elliptical orbit respectively with the point having the highest altitude and the point having the lowest altitude. The angle of inclination of the perigee relative to the line of the nodes is measured by the argument ω of the perigee. In the embodiment shown, the orbit O is circular, and the apogee T and the perigee B are substantially at the same altitude, with ω=90°.

The longitude Ω of the ascending node is also defined, which longitude is the angle between the direction of the vernal point g and the line connecting the descending node ND to the ascending node NA. The longitude Ω of the ascending node is measured going from the direction of the vernal point g towards the ascending node NA, corresponding to the direction of rotation of the Earth, likewise indicated by an arrow in FIG. 1.

It is thus possible to define an orbit plane by means of the angle of inclination i and the longitude Ω of the ascending node.

The satellite then describes a circular or elliptical orbit in the orbit plane PO as defined in this way.

For a circular orbit, the altitude is then substantially constant.

For an elliptical orbit, altitude varies between a maximum value when the satellite is at the apogee of its trajectory, and a minimum value when the satellite is at the perigee of its trajectory. For such an elliptical orbit, the term "altitude" is used to designate an altitude at a given point of the orbit, e.g. the altitude at the ascending node, at the descending node, at the perigee, or at the apogee.

FIG. 2 shows two circular orbits O1 and O2 having the same angle of inclination i and having distinct ascending node longitudes, thereby leading to an offset on between the orbits O1 and O2.

Figure 3:
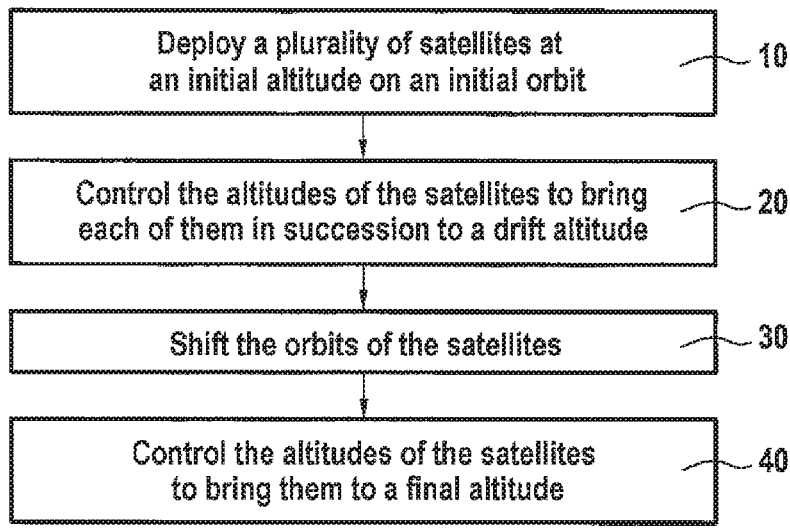
FIG. 3 is a diagram showing the steps of the method in an aspect of the invention.

FIG. 3 is a diagram showing the steps of the method in an aspect of the invention.

Figure 4:
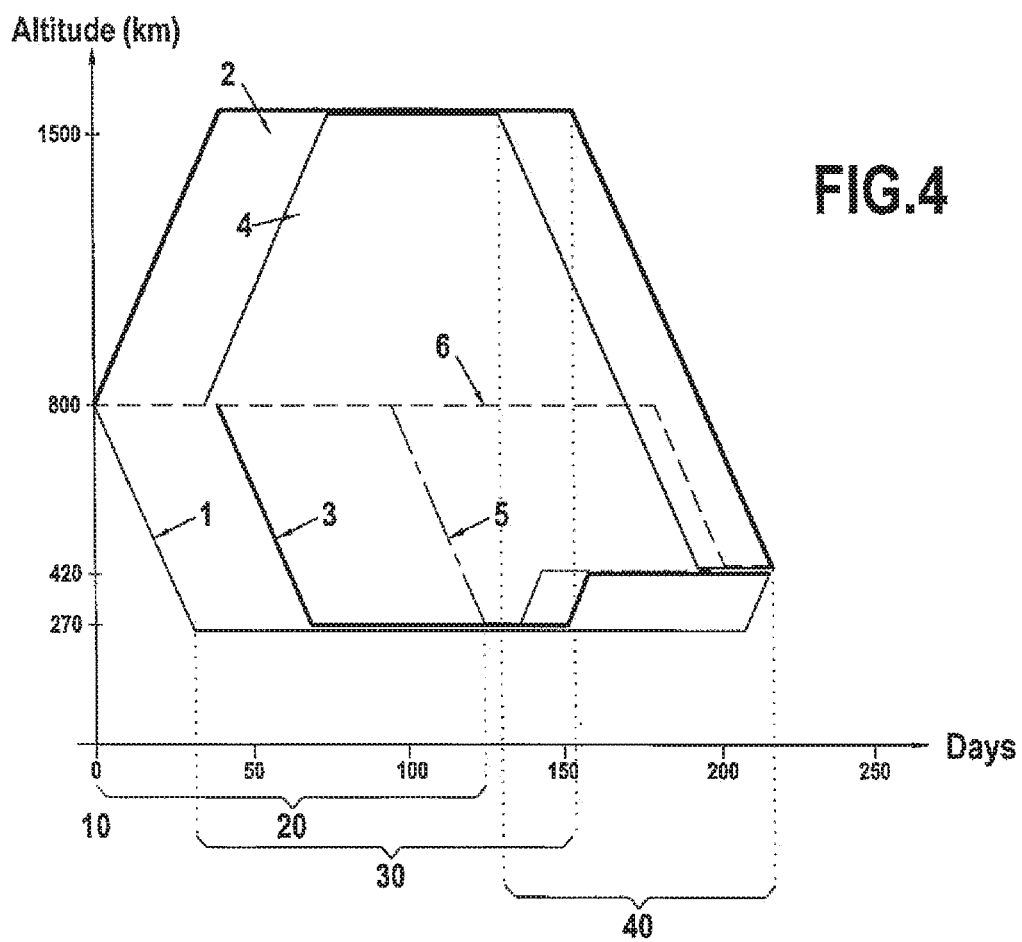
FIG. 4 is a diagram showing an example of the method in an aspect of the invention for deploying a satellite constellation.
Figure 5:
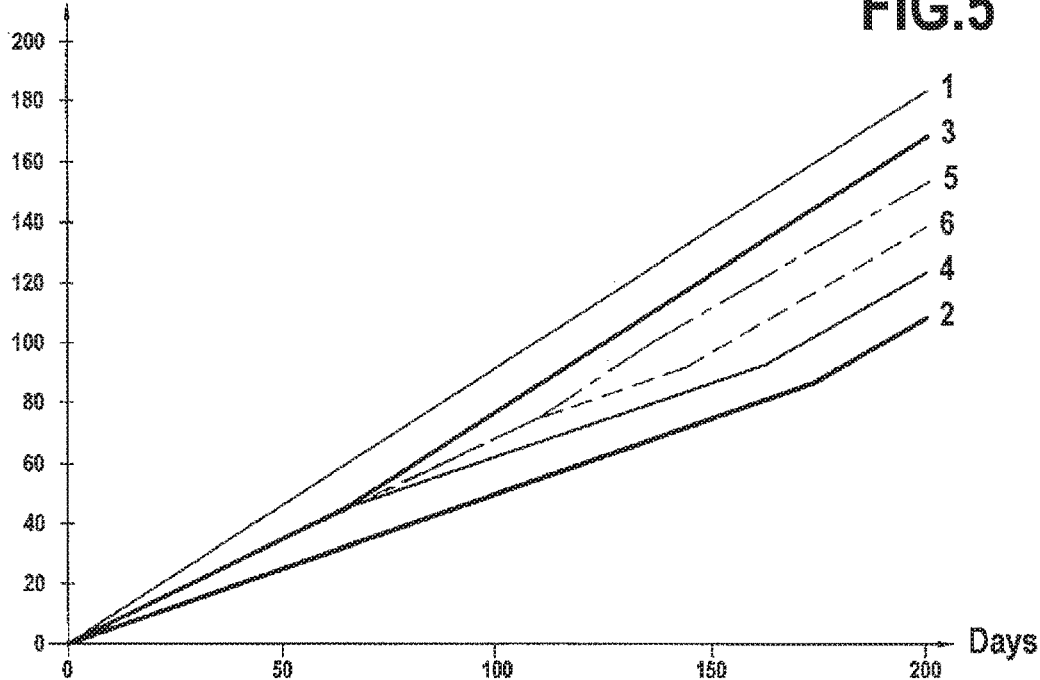
FIG. 5 shows an example of how the drift of the various orbits of the satellites varies in the example shown in FIG. 4.

FIGS. 4 and 5 show an implementation of the method of an aspect of the invention. FIG. 4 shows the variation of altitude for the satellites of a satellite constellation deployed by means of a method in an aspect of the invention. FIG. 5 shows the variation of the longitude Ω of the ascending node of each of these satellites as a function of time.

In a first deployment step 10, a plurality of satellites of a constellation are deployed by means of a single launcher.

This plurality of satellites may correspond to all of the satellites of a constellation or to only some of them. In the example described below and shown in FIGS. 4 and 5, consideration is given to deploying a set of six satellites in a single launch.

The plurality of satellites are deployed at a common initial altitude in a common initial orbit.

FIGS. 4 and 5 show this deployment step at t=0; all six satellites deployed during the single launch have the same altitude and the same orbit.

Once the deployment step 10 has been carried out, a step 20 is performed of controlling the altitudes of the satellites as deployed in this way so as to bring each satellite to a drift altitude, while remaining in the initial orbit plane.

The drift altitudes are selected from a drift set comprising a plurality of altitude values, and including by way of example the initial altitude.

In the example shown, the drift set has three altitudes:

the initial altitude;

a high drift altitude, higher than the initial altitude; and a low drift altitude, lower than the initial altitude.

In this example, the initial altitude is 800 km, the high drift altitude is 1500 km, and the low drift altitude is 270 km.

Other implementations are possible, e.g. having a larger or smaller number of altitudes in the drift set, and optionally including the initial altitude and/or the final altitude in the drift set.

In general manner, the starting altitude, the high drift altitude, the low drift altitude, and the final altitude all lie in the range 150 km to 75,000 km.

By way of example, the starting altitude may lie in the range 33,000 km to 38,000 km, and the final altitude may lie in the range 20,000 km to 25,000 km.

When some of the satellites in the set have a drift altitude that is not very high, it may be necessary to apply a thrust force in order to compensate for atmospheric drag and thus maintain the satellite at the drift altitude.

FIG. 4 shows an example of the spread of durations for the step 20 of controlling the altitudes of the satellites.

As shown in this figure, two satellites are controlled to leave the initial altitude in order to reach their respective drift altitudes as soon as the deployment step 10 has been performed.

Subsequently, three other satellites are taken in succession to their drift orbits; two satellites are thus controlled in succession to reach their respective drift orbits at about 50 days after the launch step 10, and a fifth satellite is controlled to reach its drift orbit at about 100 days after the deployment step 10. The sixth satellite remains on the initial orbit.

As soon as their altitudes differ, the various satellites shift progressively relative to one another during a shifting step 30.

Specifically, the Earth is not a perfect sphere; in particular it is flattened at its poles, thereby leading to significant disturbance in its main gravitational potential.

This disturbance leads to the orbits of the satellites orbiting at different altitudes becoming modified progressively depending on their inclination, with the force that is exerted on a body as a result of the Earth's gravitational field depending on the body's distance from the Earth.

Thus, if the initial orbit is considered as a reference orbit, then the satellites that are taken to drift altitudes distinct from the initial altitude have orbits that become modified progressively relative to the initial orbit. This modification of orbit leads to a modification to the longitude Ω of the ascending node, which increases for satellites having a drift orbit of altitude lower than the initial altitude, and that decreases for satellites having a drift orbit that is higher than the initial altitude. The trajectories of the various orbits of the satellites nevertheless remain identical; only the longitude Ω of the ascending node changes.

It should be observed that the initial orbit in this example is selected as the reference orbit, but that this selection is arbitrary and serves only for describing the shifting of the orbits of the satellites relative to one another.

The spread in the times at which the various satellites are sent to their respective drift altitudes serves to obtain different shift values, even though several satellites are sent to drift altitudes that are identical.

FIG. 5 shows how the longitude $\Omega$ of the ascending node varies over time for the six satellites under consideration.

In FIG. 5, there can be seen several changes of slope in the curves showing variation over time in the longitude $\Omega$ of the ascending node, with these changes in slope corresponding to variations in the altitudes of the satellites under consideration.

The satellites are subsequently taken to a final orbit in a final control step 40, in which the various satellites are controlled so as to be taken to a final altitude from their respective drift altitudes.

The final altitude typically lies between the initial altitude and the low drift altitude. The final altitude may also belong to the drift set; all or some of the satellites then do not need to change their altitude during this final control step 40. The final altitude lies typically in the range 200 km to 800 km, which corresponds to the altitude commonly used for observation satellites.

In the example shown, the satellites are taken successively to a final altitude of 420 km.

In a variant, the satellites may be taken to the final altitude simultaneously, or they may be taken in groups.

This final control step is configured so that once the satellites have been taken to the final altitude, their respective orbits are shifted relative to one another, e.g. in such a manner that the various orbits present the same identical angle of inclination i relative to the equatorial plane, while the longitude $\Omega$ of the ascending node of each orbit is different. By of example, the angle of inclination may be 96°. The angle of inclination of the final orbits may be identical to or different from the angle of inclination of the initial orbits.

The final orbits of the various satellites thus follow trajectories that are identical but that are shifted relative to one another by an angle of rotation about a common axis, specifically the axis of rotation of the Earth.

In the embodiment shown, the control steps 20, the drift step 30, and the final control step 40 are configured in such a manner that the variation in the longitude $\Omega$ of the ascending node between orbits of two adjacent satellites is constant once the satellites have been taken to the final altitude, and in this example it is equal to 15°.

As can be seen in FIG. 4, the control steps 20, the shifting step 30, and the final control step 40 overlap; for example, some satellites are performing their final control step 40 while others are still in the shifting step 30.

Figure 6:
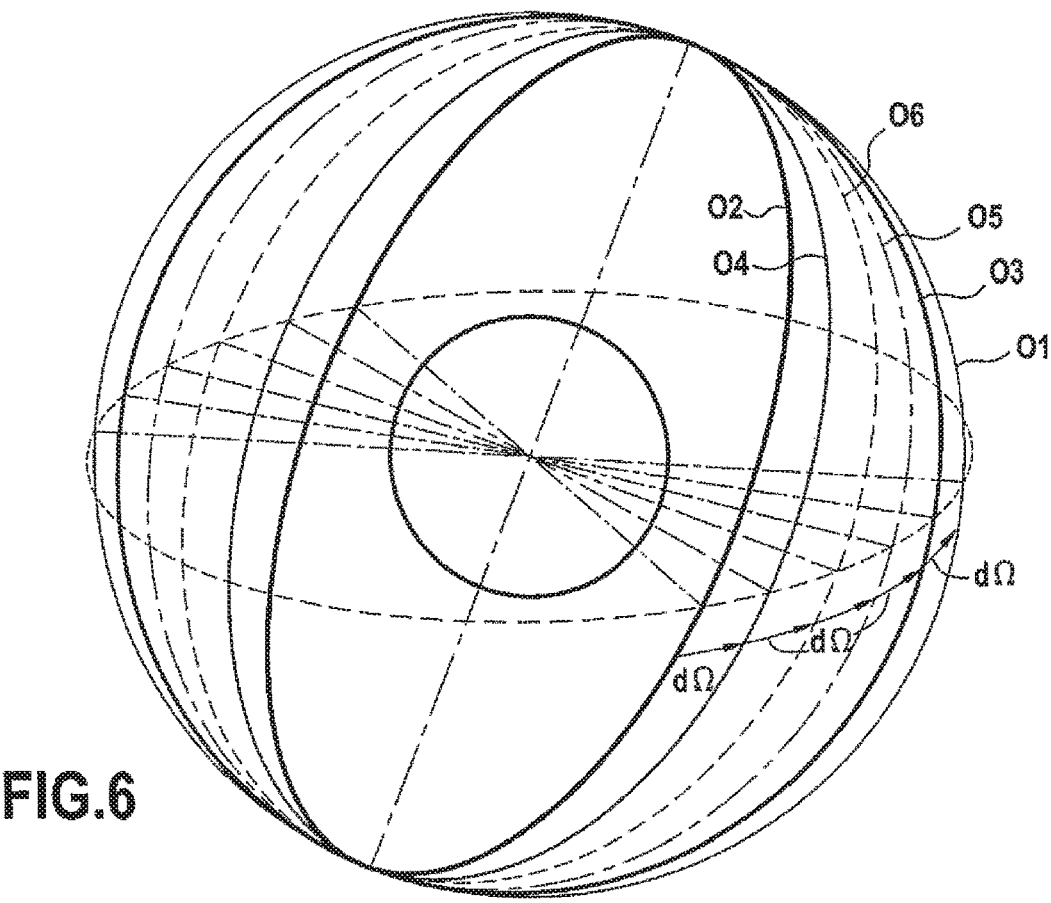
FIG. 6 shows an example of a satellite constellation deployed by means of a method in an aspect of the invention.

FIG. 6 shows an example of a constellation of satellites deployed using a method in an aspect of the invention.

This figure shows the orbits O1 to O6 of six satellites as described above with reference to FIGS. 4 and 5. As stated above, the control step 20, the drift step 30, and the final control step 40 are configured so that the variation in the longitude $\Omega$ of the ascending node between the orbits of two adjacent satellites is such that once the satellites have been taken to the final altitude, the resulting $d\Omega$ is constant between any two successive orbits.

The method as described above thus enables a plurality of satellites in a satellite constellation to be deployed in a single launch, and enables their respective orbits to be shifted mutually by making use of the gravitational potential of the Earth. The method may be used to deploy satellite constellations with orbits of any type: circular, elliptical, low orbit, or high orbit.

This method thus makes it possible to avoid consuming a large amount of propellant in order to modify the orbits of the satellites, and to reduce significantly the number of launches that are needed for such deployment.

As a function of the desired final orbits, a constellation of satellites can thus be put into place in less than one year.

By way of example, the deployment of a constellation of 12 satellites by means of two launches, each carrying six satellites, and by performing the proposed method can be achieved within less than one year.

The invention claimed is:

1. A method of deploying a constellation of satellites, the method comprising the following steps:
   using a single launch vehicle to deploy a plurality of satellites at a same initial altitude on a same initial orbit;
   controlling said satellites in such a manner that, depending on the initial orbit, an altitude of some of the satellites is modified while an inclination relative to an equatorial plane and a type of trajectory, of the some of the satellites, remains identical so that each satellite reaches a drift altitude selected from a drift set, with orbits of various satellites shifting relative to one another at respective drift altitudes under an effect of a gravitational potential of Earth; and
   controlling the satellites in such a manner as to be moved sequentially in order to reach a same final altitude, said sequential movement being performed in such a manner that the satellites describe final orbits having trajectories with a same angle of inclination relative to the equatorial plane, a same apogee point and a same perigee point, and the same final altitude but presenting distinct longitudes for ascending nodes, wherein the final orbits of the satellites are angularly offset relative to one another about the Earth's axis of rotation, and wherein said final orbits present a constant angular offset $d\Omega$ between two successive final orbits.

2. A method according to claim 1, wherein said final altitude lies in the range of 200 km to 800 km.

3. A method according to claim 1, wherein said drift set comprises a high drift altitude and a low drift altitude, having respectively an altitude that is higher and an altitude that is lower than the initial altitude.

4. A method according to claim 3, wherein a starting altitude, the high drift altitude, the low drift altitude, and the final altitude lie in the range of 150 km to 75,000 km.

5. A method according to claim 4, wherein the starting altitude lies in the range of 33,000 km to 38,000 km, and the final altitude lies in the range of 20,000 km to 25,000 km.

6. A method according to claim 3, wherein the final altitude of said satellites lies between the initial altitude and the low drift altitude.

7. A method according to claim 6, wherein a starting altitude is 800 km, the high drift altitude is 1500 km, the low altitude is 270 km, and the final altitude is 420 km.

* * * * *